United States Patent [19]
Compton et al.

[11] 3,930,846
[45] Jan. 6, 1976

[54] METHOD FOR PRECIPITATING COPPER METAL FROM COPPER BEARING SOLUTIONS

[75] Inventors: James Carl Compton, Hillsborough; Wilbert Norman Sims, Alamo, both of Calif.

[73] Assignee: Marcona Corporation, San Francisco, Calif.

[22] Filed: Oct. 10, 1974

[21] Appl. No.: 513,879

[52] U.S. Cl. .................... 75/109; 75/117; 266/22
[51] Int. Cl.² ................................. C22B 15/12
[58] Field of Search .................. 75/109, 117; 266/22

[56] References Cited
UNITED STATES PATENTS

| | | |
|---|---|---|
| 3,333,953 | 8/1967 | Zimmerley et al.............. 75/117 X |
| 3,560,201 | 2/1971 | Lefler et al. ..................... 75/109 |
| 3,606,290 | 9/1971 | Ransom ........................... 75/117 X |
| 3,674,466 | 7/1972 | Anderson et al. ................ 75/109 |

*Primary Examiner*—G. Ozaki
*Attorney, Agent, or Firm*—Flehr, Hohbach, Test, Albritton & Herbert

[57] ABSTRACT

Precipitating copper metal from copper bearing solutions using scrap iron as a precipitant to form free copper metal precipitate. The scrap iron is retained in an unflooded bed in a container having a rotatable nozzle for spraying the copper bearing solution in a high velocity jet stream which penetrates into the bed to react with the iron to form copper and strips off the copper metal from the scrap iron. In the bottom of the container is a sieve for retaining the scrap iron while withdrawing the copper metal and the expended solution.

6 Claims, 4 Drawing Figures

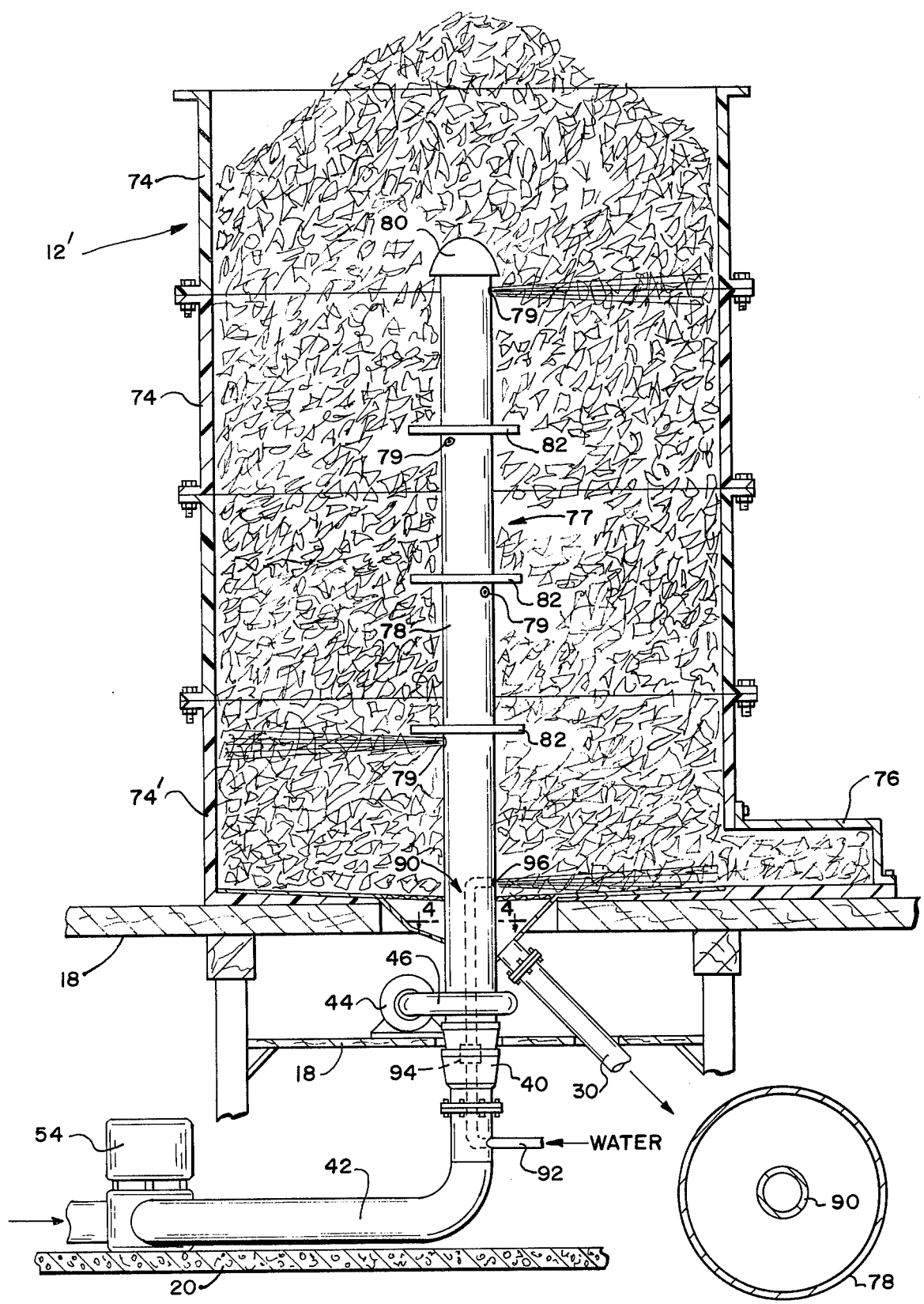
FIG.—3  FIG.—4

METHOD FOR PRECIPITATING COPPER METAL FROM COPPER BEARING SOLUTIONS

BACKGROUND OF THE INVENTION

1. Field of the Invention

This invention relates to metallurgical processing and equipment and more particularly to equipment and processing for recovering metallic copper from copper bearing solutions.

2. Description of the Prior Art

In the production of copper it is a conventional practice to leach copper ore with sulfuric acid. This practice produces a solution containing dilute copper sulfate. To recover metallic copper from the dilute copper sulfate solution, it is also a conventional practice to precipitate the copper metal out from the solution using scrap iron for the precipitant. The process of precipitating copper metal from copper bearing solutions using scrap iron is generally called "cementation" and the precipitate is called "cement copper".

In the process of copper cementation there are three important chemical reactions. These reactions are:

$$Fe(metal) + CuSO_4 \rightarrow Cu(metal) + FeSO_4 \quad [1]$$
$$Fe(metal) + Fe_2(SO_4)_3 \rightarrow 3\ FeSO_4 \quad [2]$$
$$Fe(metal) + H_2SO_4 \rightarrow H_2 + FeSO_4 \quad [3]$$

It should be noted that in each of these reactions iron (Fe) is consumed. Reaction number 1 is the basic copper cementation reaction wherein the metallic copper is deposited on the surface of the iron as the reaction proceeds. Reaction number 2 depends on the amount of ferric iron present and usually consumes very little of the iron present. Reaction number 3 is the major iron dissipative reaction and does not contribute to the production of copper metal.

The oldest, most common apparatus for copper cementation is a gravity-flow launder that is charged with scrap iron and maintained in a flooded bed during processing. Although launder plants can effectively recover approximately 90% of the copper from copper bearing solution, launders fail to effectively stir up the bed of scrap iron, consume from two to four times the amount of iron theoretically required, and are difficult to recharge when depleted. Another prior art copper cementation device uses a rotating drum precipitator that continuously tumbles the total mass of scrap iron in the copper bearing solution. This requires excessively high capital and operating costs for the machinery involved. Other systems have been proposed, but they have either been too costly to implement or lacked the ability to obtain an adequately agitated bed and good precipitate-precipitant contact. An example of such systems included U.S. Pat. No. 3,606,290 to N. L. Ransom. One element common to the prior art processes is the continuous maintenance of the total scrap iron beds in a flooded or immersed condition with withdrawal of the barren solution as overflow. This continuous exposure of the entire bed of iron to sulfuric acid causes excessive consumption of iron by reaction [3] above which does not contribute to copper production. There is therefore a need for an improved copper cementation system with a reduced rate of iron consumption.

SUMMARY OF THE INVENTION

In accordance with the present invention, an apparatus is used for removing copper metal from copper bearing solutions employing a rotatable nozzle to generate a high velocity solution spray. The nozzle is rotated and directs a high velocity stream of copper bearing solution directly on the scrap iron. The high velocity stream reacts with the iron to form copper metal precipitate and strips and entrains the precipitated copper metal from the residual scrap iron to expose a fresh surface for further chemical reaction. After reacting with the scrap iron, the expended copper bearing solution and entrained copper metal is drained from the container through a sieve covering a discharge sump in the bottom of the container while retaining residual scrap in the container.

The primary object of the present invention is to efficiently process metal (e.g., copper) bearing solutions by extracting the maximum amount of metallic copper therefrom and by consuming the minimum amount of iron in so doing.

It is a particular object of the present invention to reduce the contact time between the copper bearing solution and the scrap iron, thereby minimizing the production of sulfuric acid and the consumption of iron.

Additional objects and features of the invention will appear from the following description in which the preferred embodiments of the invention have been set forth in detail in conjunction with the drawings.

BRIEF DESCRIPTION OF THE DRAWINGS

FIG. 3 is a side elevational view, partially in cross-section and partially broken away, of an alternative embodiment of an apparatus for copper cementation in accordance with the present invention; and FIG. 4 is a plan view in cross-section taken along line 4—4 of FIG. 3 of the stem of the high pressure nozzle system of the alternative embodiment of FIG. 3 in accordance with the present invention.

DESCRIPTION OF THE PREFERRED EMBODIMENTS

Figure 1:
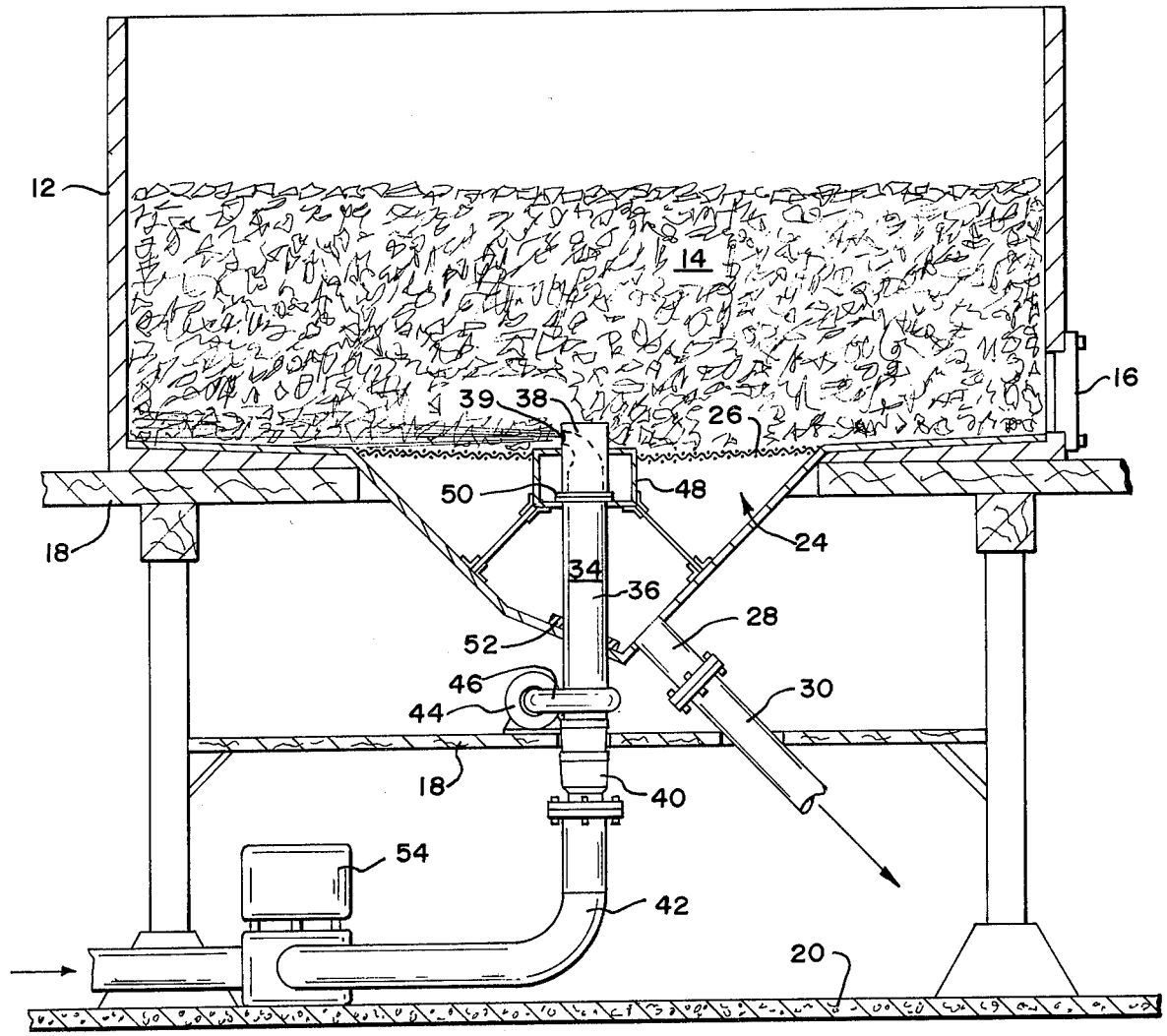
FIG. 1 is a side elevational view, partially in cross-section and partially broken away, of an apparatus for copper cementation in accordance with the present invention.

Suitable apparatus for carrying out the process of the present invention is as follows. Referring to FIG. 1, reference numeral 12 indicates a stainless steel container for holding a charge of scrap iron 14 suitably fed through the open top of the container. The scrap iron can be any suitable light scrap iron such as crushed or shredded detinned tin cans. The container 12 is fabricated from stainless steel in order to prevent the walls thereof from reacting with the copper bearing solution. The side wall of the container is provided with a manhole 16 providing access for the interior of the container. During operation a certain amount of residue including small pieces of concrete, rocks, granular copper, and copper-plated steel collects in the bottom of the container. From time to time, this residue is removed from the container through the manhole 16. The container 12 and the scrap iron 14 therein are supported by a wooden platform 18 on a concrete foundation 20.

The bottom of the container 12 is closed by a discharge sump 24 fabricated from stainless steel. The sump provides a collection passage into which the expended copper bearing solution and the precipitated copper can flow after completing the chemical reaction. The bottom wall of the container 12 slopes downwardly toward the discharge sump 24 in order to fully drain all of the liquid therein into the discharge sump. Sump 24 is covered by a sieve or screen 26 that physically separates it from the container 12. The size of the openings in the sieve is large enough to permit the precipitated copper and the expended solution to pass therethrough and yet small enough to prevent the scrap iron and non-reacted material from entering the discharge sump 24. The bottom of the discharge sump is connected to a drain manifold 28 and a discharge header 30. The manifold and header provide a means for draining the the precipitated copper metal and the expended solution from the discharge sump.

In accordance with the present method, a metal (e.g., copper) is precipitated from a metal bearing solution (e.g., copper sulfate) by reaction with a suitable solid precipitant (e.g., scrap iron) and separated from the same. For simplicity of description, the specification will refer to the foregoing system although it should be understood that the technique is applicable to other systems in which similar chemical reactions take place.

In general, a bed of the solid precipitant is formed in a reaction vessel or container. The copper sulfate is then directed in a high velocity jet stream which is rotated to sweep out an arc which impinges upon the scrap iron in its path. An important feature of the invention is the avoidance of excessive consumption of the scrap iron by reaction with sulfuric acid according to reaction [3] set forth above. This reaction does not contribute to metallic copper production and is minimized by retaining the scrap iron bed in an essentially unflooded or unimmersed state. The copper sulfate solution in a high velocity stream rotates in an essentially horizontal path to impinge upon and vigorously agitate the scrap iron in its path. Since the bed is not flooded, the force of the stream is not impeded by unnecessary passage through a body of liquid. The stream has so much momentum that the force of the solution impinging upon the scrap iron causes the formation of a precipitate of the free copper in accordance with reaction [1]. Then, subsequent streams strip the free metal copper from the scrap metal and entrains the same. This copper entrained solution is then separated as underflow from the residual scrap iron in the vessel. This is accomplished by passing the entrained solution through a sieve with openings too small to pass the scrap iron. The barren solution is withdrawn as underflow, together with the metallic copper. Otherwise, it would be necessary to flood the bed with the aforementioned excessive consumption of scrap iron.

The copper bearing solution may be simultaneously directed into the container from a plurality of vertically spaced high velocity jet streams to increase the reaction rate in a particular reactor. Furthermore, the free copper-entrained spent solution withdrawn as underflow may be directed to a second stage reactor vessel for repeating the foregoing method to precipitate further metal.

An aqueous rinsing stream may be directed in a similar high velocity gas stream into the bed after terminating the flow of the metal bearing solution to entrain remaining free metal precipitate on the bed particles after completion of the reaction. This stream is removed from the vessel through the sieve.

The copper bearing solution is added to the scrap iron 14 in the container 12 through a high pressure nozzle system 34 that includes a high pressure nozzle 38. The high pressure nozzle is a rotatable nozzle having an exit orifice 39 that is substantially confined within either the real or the imaginary extension of the cylindrical stem 36. The high pressure nozzle, thus, has no protrusions that could engage the scrap iron and impede the rotation of the nozzle system. A suitable nozzle is disclosed in U.S. Pat. No. 3,749,314 entitled "Liquid Jet Nozzle", issued to Robinson et al on July 31, 1973. The high pressure nozzle directs the copper bearing solution into the scrap iron in a high velocity, high momentum stream with minimum dispersion in an outward radial direction and rotates to sweep out a substantially horizontal arc generally parallel to the bottom of the vessel.

The high pressure nozzle system 34 also includes a stem 36 that is mounted to the nozzle 38. The stem is a hollow, cylindrical, rotatable pipe. The stem 36 is connected by a rotary union 40 to an inlet pipe 42. The rotary union provides a leak-proof seal for the high pressure solution travelling through the nozzle system 34 and permits the stem 36 and the nozzle 38 to rotate with respect to the container 12. The stem and the nozzle are rotated with a worm and wheel gear 46 driven by a hydraulic motor 44 mounted on the wooden platform 18.

The high pressure nozzle 38 is retained in place by a supporting structure 48 onto which is mounted a nozzle bearing and seal 50. The supporting structure both guides the high pressure nozzle during rotation and also supports the sieve 26 in relation thereto. The stem 36 is retained in place by a stem bearing and seal 52 in the bottom wall of the discharge sump 24. The copper bearing solution is supplied at high pressure through the nozzle system 34 to the container 12 by a pump 54 that discharges into the inlet pipe 42.

Figure 2:
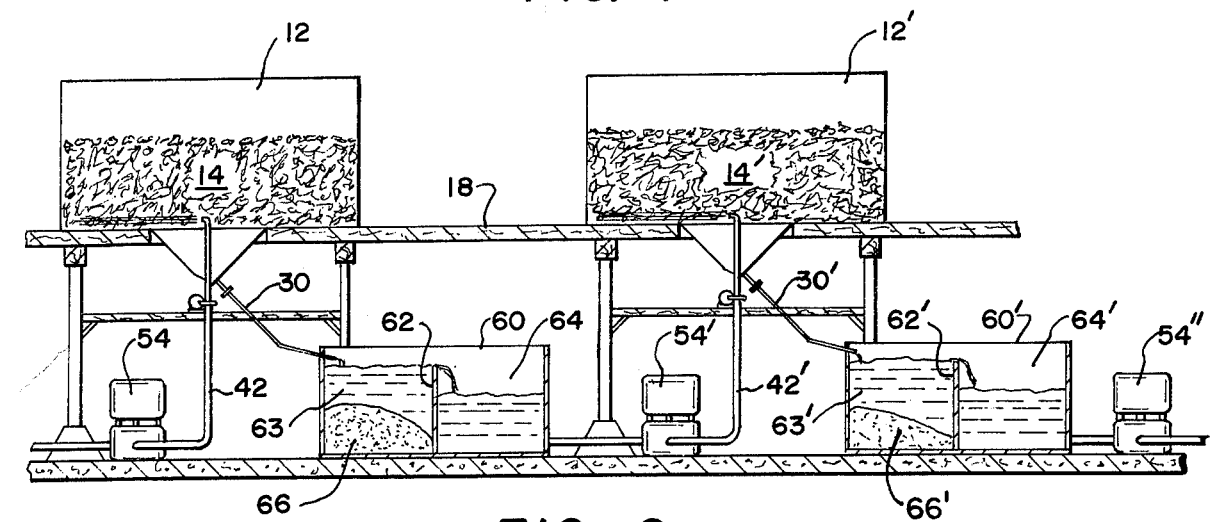
FIG. 2 is a side elevational view, partially in cross-section and partially broken away, of the copper cementation apparatus as illustrated in FIG. 1 further including two settling tanks for the cement copper.

In FIG. 2 two containers for copper cementation are illustrated connected for series operation. The discharge header 30 connected to the container 12 dumps the expended solution therefrom into a settling tank 60. The expended solution contains both metallic copper in particulate form and expended copper sulfate liquid. The settling tank contains an internal side wall 62 separating the settling tank into two compartments. In the first compartment 63, the particulate copper metal settles out as cement copper 66 and the copper sulfate liquid overflows into the second compartment 64. A second high pressure pump 54' takes a suction on the second compartment 64 of the settling tank and pumps the solution therein into the second container 12'. The second container 12' drains into a second, similar, settling tank 60' leaving the cement copper 66' in its first compartment. The second settling tank 60' is drained in turn by a third pump 54". The two containers 12, 12' and the two settling tanks 60, 60' are used in series in order to maximize the amount of precipitation of copper out of the copper bearing solution.

In operation the pump 54 injects the copper bearing solution at high pressure into the inlet pipe 42. The copper bearing solution then travels in turn through the rotary union 40, the stem 36, and the high pressure nozzle 38. The solution is sprayed onto the scrap iron 14 from the nozzle orifice 39 with a minimum of divergence. The rotating stream from the nozzle has so much momentum that the force of the solution impinging on the scrap iron causes the particles to become agitated and strips away the precipitated copper metal adhering to the surface of the scrap iron leaving exposed metal surface available for further chemical reaction. The volume of the stream is insufficient to flood the scrap iron bed and so the force of the stream is not impeded by a liquid barrier.

During operation the high pressure nozzle 38 is slowly rotated by the hydraulic motor 44. The spray from the nozzle, thus, slowly rotates around the bottom of the container 12 and impinges upon all of the scrap metal therein.

After the chemical reaction has occurred, the precipitated copper and the expended solution fall through the sieve 26 into the discharge sump 24 and thereafter through the drain manifold 28 and the discharge header 30. The discharge header empties into the settling tank 60, and the cement copper 66 is collected in the first compartment 63 thereof. The expended solution overflows the side wall 62 into the second compartment 64 is also a suction sump for the second pump 54' that injects the expended solution into the second container 12'. The above described process is repeated in the second container 12' and the second settling tank 60'.

An alternative embodiment of the present invention is illustrated in FIGS. 3 and 4. The scrap iron container is fabricated from a plurality of cylindrical fiberglass tower sections 74, fabricated from fiberglass in order to resist the corrosive action of the copper bearing solution contained therein. The tower sections are bolted together to form a cylindrical scrap iron holding container 12'. The lowermost tower section 74' further includes a cleanout chamber 76 providing access for personnel to the bottom of the container in order to permit removal of residue.

Within the container 12' is a rotatable high pressure nozzle column 77. The high pressure nozzle column includes an elongate, vertical stem 78 having a plurality of nozzle orifices 79 thereon. The orifices do not project from the cylindrical side wall of the stem. Thus, the stem freely rotates and does not engage the surrounding scrap iron. The nozzles 79 are angularly distributed about the stem as well as linearly distributed along its longitudinal axis. Each nozzle directs a high velocity spray of copper bearing solution onto the surrounding scrap iron. The momentum of the spray strips away the precipitated copper to leave an exposed iron surface. Surmounting the vertical stem 78 is an end cap 80. Located above each nozzle centrally disposed on the stem is a radially extending circular collar 82 for assisting in keeping the region immediately adjacent the nozzle path free of material.

The stem is slowly rotated by a hydraulic motor 44 attached to a worm gear assembly 46 also hereinbefore described. As the stem 78 slowly rotates, the array of nozzles provides a plurality of horizontal tiers of high velocity solution sprays. The effect of the nozzle column 77 is to bring the predominant portion of the scrap iron in container 12' into chemical reaction simultaneously.

The high pressure nozzle column 77 also contains a water manifold 90. The water manifold includes a water inlet pipe 92 penetrating the solution inlet pipe 42. The water manifold thereafter extends vertically and coaxially inside of the stem 78. The water manifold also has a rotary union 94 permitting the upper portion of the water manifold to rotate with the stem 78. The water manifold terminates at a nozzle 96 that is similar to the other nozzles 69 on the nozzle column. The water nozzle directs water into the lowermost tower section 74' during the last portion of each operating cycle to entrain any residual copper metal as a rinsing stream.

While a specific disclosure and embodiments have been shown herein, it should be realized that many modifications and changes can be made by those skilled in the art without departing from the spirit of the present invention. In addition, a plurality of high pressure nozzles may be disposed in various locations throughout the container. Accordingly, the scope of this invention should be understood in a broader context limited only by the following claims as interpreted in the light of the foregoing examples.

We claim:

1. In a method of precipitating copper from a copper bearing solution in a container using a particulate solid precipitant which reduces the copper in solution to form the free copper, the steps of forming a bed of the solid precipitant, directing the copper bearing solution in a high velocity jet stream and rotating said stream to sweep out an arc which impinges upon and vigorously agitates the solid precipitant in its path with sufficient force to chemically react with the same to form a precipitate of the free copper of relatively small size in comparison to the precipitant and to entrain copper precipitate formed in the bed by such chemical reactions, and continuously separating the free copper and essentially all of the spent solution as underflow from the residual precipitant in the vessel, said precipitant bed being maintained in an essentially unflooded state in solid-to-solid contact.

2. A method as in claim 1 together with the additional steps of directing an aqueous rinsing stream in a high velocity jet stream into the bed after directing the copper metal bearing solution to further entrain free copper precipitate, and withdrawing said free metal-entrained rinsing stream as underflow from the container.

3. A method in claim 1 in which said copper bearing solution is simultaneously directing into said container from a plurality of vertically spaced high velocity jet streams.

4. A method as in claim 1 in which the free copper and spent solution are withdrawn as underflow through a screen with openings large enough to pass the free copper but small enough to retain the precipitant.

5. A method as in claim 1 together with the steps of separating the withdrawn spent solution from the withdrawn free copper and directing the solution to a second stage reactor vessel repeating the method of claim 1 to precipitate further copper.

6. A method as in claim 1 in which the metal solution comprises copper sulfate, and the precipitant comprises iron.

* * * * *